(12) United States Patent
Takeuchi (10) Patent No.: US 7,955,066 B2
(45) Date of Patent: Jun. 7, 2011

(54) ICE-CANDY FORMING CONTAINER

(75) Inventor: Shoji Takeuchi, Osaka (JP)

(73) Assignee: Zensho Co., Ltd., Minato-Ku (JP)

( * ) Notice: Subject to any disclaimer, the term of this patent is extended or adjusted under 35 U.S.C. 154(b) by 715 days.

(21) Appl. No.: 11/970,084

(22) Filed: Jan. 7, 2008

(65) Prior Publication Data

US 2009/0175991 A1   Jul. 9, 2009

(51) Int. Cl.
*A23G 9/00* (2006.01)

(52) U.S. Cl. .......... 425/117; 249/92; 249/96; 425/126.2

(58) Field of Classification Search .................... 249/92, 249/96, 117, 121, 160; 425/117, 126.2
See application file for complete search history.

(56) References Cited

U.S. PATENT DOCUMENTS

| | | | | |
|---|---|---|---|---|
| 1,476,910 A | * | 12/1923 | Naugle | 249/121 |
| 2,003,612 A | * | 6/1935 | Schnaier | 249/92 |
| 2,389,530 A | * | 11/1945 | Miner | 249/120 |
| 2,932,386 A | * | 4/1960 | Ushkow | 249/121 |
| 2,980,248 A | * | 4/1961 | Embring | 249/121 |
| 3,135,101 A | * | 6/1964 | Nigro | 249/127 |
| 4,546,615 A | | 10/1985 | Gram | |
| 4,548,573 A | * | 10/1985 | Waldstrom | 425/126.2 |
| 4,761,128 A | * | 8/1988 | Fowler et al. | 425/126.2 |
| 4,887,790 A | * | 12/1989 | Wilkinson et al. | 249/121 |
| 6,565,902 B2 | * | 5/2003 | Ruano Del Campo et al. | 425/126.2 |
| 7,223,430 B2 | * | 5/2007 | Wray | 425/126.2 |

FOREIGN PATENT DOCUMENTS

| | | | |
|---|---|---|---|
| JP | 46-20315 | | 7/1971 |
| JP | 56-039749 | | 4/1981 |
| JP | 59-120055 | | 7/1984 |
| JP | 64-22285 | | 2/1989 |
| JP | 2-174639 | * | 7/1990 |
| JP | 3055289 U | | 10/1998 |
| JP | 2003-116467 A1 | | 4/2003 |

* cited by examiner

*Primary Examiner* — James Mackey
(74) *Attorney, Agent, or Firm* — Burr & Brown (57) ABSTRACT

An ice-candy forming container is provided which produces ice-candies having a complicated shape copying the face of a cartoon character or the like with higher quality and without a loss in shape. A forming container includes a first mold having a pattern portion formed in one face thereof, and a second mold configured to slide over and along the one face of the first mold, in a close contact relation, in directions designated by arrows A1-A2, so as to contain the first mold therein. In such a containing position, the second mold contacts externally and closely substantially an entire surface of the outer periphery of the pattern portion.

2 Claims, 7 Drawing Sheets

ICE-CANDY FORMING CONTAINER

CROSS REFERENCE TO RELATED APPLICATIONS

This application is based upon the prior Japanese Patent Application No. 2005-296031 filed on Oct. 11, 2005, the entire contents of which are incorporated herein by reference.

FIELD OF THE INVENTION

The present invention relates to an ice-candy forming container and an ice-candy producing method, for forming an ice-candy (or ice-lolly or popsicle), including an ice cream, a bar of sherbet, a sherbet and the like, which are used when making such products. In particular, this invention relates to the ice-candy forming container and the ice-candy forming method that can produce ice-candies or the like having a complicated shape with high quality.

BACKGROUND OF THE INVENTION

As the method of producing ice-candies and/or ice creams, those described in Patent Document 1 and Patent Document 2 have been known, both of the references employing a forming container for forming such products.

The forming container described in the Patent Document 1 has an opening formed therein, and a raw material liquid (or mix) for the ice-candy or the like can be poured into the forming container via the opening. The forming container is then cooled while the mix is held therein. As a result, the mix poured in the forming container is frozen, as such the ice-candy or the like can be produced. Thereafter, each ice-candy or the like is pulled out from the forming container via the opening.

Upon pulling out each ice-candy or the like (i.e., the mix in a frozen state), it is not permitted that the product gets out of shape, because of keeping acceptable quality. However, in the method for producing the ice-candies or the like by pouring the mix into the forming container as described in the Patent Document 1, it is not possible to make the internal shape of the forming container complicated, in order to prevent the frozen mix from getting out of shape. As such, only the ice-candies or the like having a simple shape, such as a rectangular parallelepiped shape or cylindrical shape, can be produced.

In recent years, however, needs for the ice-candies or the like having a complicated shape, such as a shape copying a face of a cartoon character, have been increased. As one means for enabling the ice-candies having such a complicated shape to be produced, for example, the forming container for producing the ice-candies as disclosed in Patent Document 2 and the like has been known.

Figure 13:
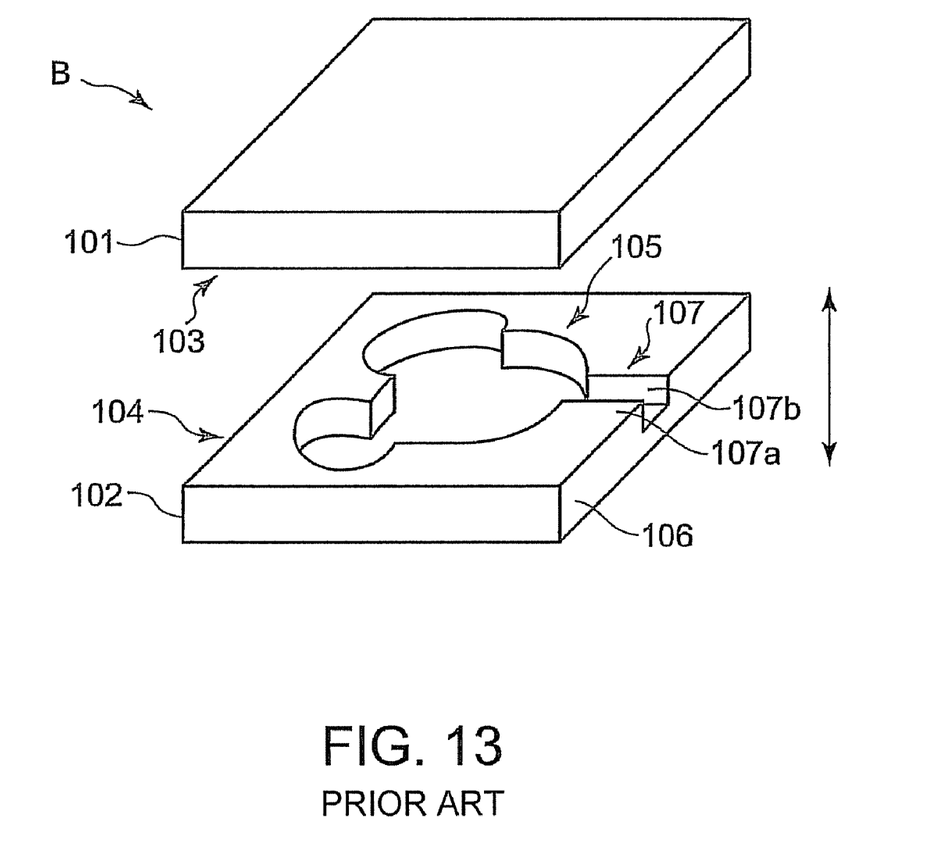
FIG. 13 is a perspective view of the prior art ice-candy forming container.

Such a forming container B for forming the ice-candies is shown in FIG. 13. The forming container B shown in FIG. 13 includes a first mold 101 and a second mold 102. One particular face 103 or 104 of each mold 101, 102 having a substantially rectangular parallelepiped shape is used as one to be faced in close contact with each other. One or both of such faces 103, 104 to be faced each other have a pattern portion 105 comprising a hole with a shape copying a face of a cartoon character or the like. In the face 104, a groove-like stick holding portion 107 is formed such that it connects at its one end with the pattern portion 105 and communicates at its the other end with the outside from a face 106 orthogonal to the face 104.

Now, a method of producing ice-candies, which employs such a forming container B, will be described.

On producing each ice-candy, the forming container B is prepared such that the faces 103 and 104 are to be faced in close contact with each other. In addition, a stick for the ice-candy is inserted from the outside of the forming container B through the stick holding portion 107 into the pattern portion 105. In this manner, a left wall 107a and a right wall 107b of the stick holding portion 107 serve to grasp the stick therebetween, as such the stick can be securely held by the stick holding portion 107. While this state remains, the mix is poured into the pattern portion 105 via the stick holding portion 107.

With the mix fully filled in the pattern portion 105, the forming container B is immersed in a brine tank filled with a coolant, for example, calcium chloride. Consequently, the mix filled in the pattern portion 105 is cooled together with the forming container B, and then frozen. After the freezing is completed, the faces 103, 104 are separated from each other, and the frozen mix, i.e., the ice-candy, is released from the mold 101 or 102. In this way, the ice-candy having a shape corresponding to the pattern portion 105 and holding the stick can be produced.

Patent Document 1: TOKUKAI No. 2003-116467, KOHO
Patent Document 2: TOUROKU JITSUYOUSINAN No. 3055289, KOHO However, the mix should be expanded as the mix filled in the pattern portion 105 is cooled and frozen. Due to such expansion of the mix, it should be difficult to maintain the closely contacting state between the two faces 103 and 104. As a result, calcium chloride as the coolant may tend to penetrate into the pattern portion 105 and be incorporated into the mix, as such rendering the ice-candy an undesirably bitter taste. Otherwise, the mix may tend to flow out of the pattern portion 105 so as to form an unwanted flash after the freezing of the mix. Such phenomena inevitably deteriorate the quality of the ice-candy.

Furthermore, in the case of producing ice-candies having a complicated shape, it is quite difficult to release the frozen mix from the mold 101 or 102 with no loss of shape of the product. Namely, the ice-candy frozen in the pattern portion 105 is firmly fixed to the pattern portion 105, as such it can not be released therefrom with ease. If attempting to release it by force, the stick may be broken or otherwise the ice-candy may tend to be partly broken.

As described above, it has been difficult to produce ice-candies or the like having a complicated shape with high quality.

The present invention was made in light of the above circumstances, and therefore it is an object of this invention to provide an ice-candy forming container and an ice-candy producing method, which enable the ice-candies having a complicated shape copying a face of a cartoon character or the like to be produced with higher quality and without a loss of shape.

SUMMARY OF THE INVENTION

In order to achieve the object above, the present invention is an ice-candy forming container, comprising: a first mold having one face in which a pattern portion is formed, the pattern portion being able to be filled with a raw material liquid for an ice-candy; and a second mold configured to slide over and along the one face of the first mold in a close contact relation such that the second mold can exchangeably take a containing-in position in which it contains the first mold therein and a non-containing-in position in which it is removed from the first mold, wherein in the containing-in position, the second mold contacts closely with substantially the whole surface of the outer periphery of the pattern portion of the one face of the first mold.

With the forming container of this invention, the forming of the ice-candy (or freezing of the raw material or mix) is performed in the containing-in position in which the second mold contains the first mold therein. Thus, even though expansion of the mix occurs upon a cooling step, the first mold and the second mold will not be separated from each other, mixing of a coolant liquid into the pattern portion and flowing out of the mix to the outside of the pattern portion can be possibly prevented. As such, undesirable changes of shape and taste of the ice-candies can be prevented, thereby providing the ice-candies of higher quality.

It is preferred that the first mold and/or second mold is formed from a material having good heat conductivity, for example, aluminum or the like.

If an injection passage is provided in the first mold, the injection passage connecting one end of the first mold with the pattern portion, and if the raw material liquid can be injected into the pattern portion through the injection passage in the containing-in position, the mix can be injected into the pattern portion in the containing-in position. Consequently, a production procedure for the ice-candies, which is excellent in the cooling efficiency, such as by pouring the mix into the forming container while it is immersed in advance in a brine tank (a tank filled with the coolant liquid), can be implemented.

Alternatively, the present invention is an ice-candy forming container, comprising: a mold body having an interior in which a raw material liquid for an ice-candy can be filled; and a communication hole which is in communication with the interior and configured to allow a stick of the ice-candy to be inserted from the exterior into the interior, wherein the communication hole includes: an occupied portion to be occupied by the stick when the stick is inserted, and non-occupied portions which are formed adjacent to the occupied portion, and are not occupied by the stick when the stick is inserted, and are configured to communicate the interior with the exterior.

While the mix is expanded upon a cooling step for the mix, the expanded mix can escape to the outside of the pattern portion via the non-occupied portions. Therefore, breakage or damage of the forming container due to such expansion of the mix can be avoided. In some conventional cases, a gas is included and mixed into the pattern portion upon the production of the ice-candies so as to form air bubbles therein, thus degrading their quality. However, with the forming container of this invention, even though such a gas is mixed in the pattern portion, it can be discharged or expelled to the outside thereof via the non-occupied portions. Accordingly, the ice-candies having a significantly enhanced aesthetic value without any visible air bubbles can be produced.

However, in the case of providing the non-occupied portions as described above such that the expanded mix can escape to the outside upon the cooling step, such escaped mix will be eventually frozen to from projections at and near the respective non-occupied portions, thus compromising the aesthetic value. In particular, in the case of forming a predetermined pattern portion in the one face of the forming container so as to create a complicated shape of each ice-candy by utilizing the pattern portion, there is a need for possibly keeping a face (hereinafter, referred to as "a front face", i.e., a face opposite to the one face) to be formed by the pattern portion of the ice-candy aesthetically acceptable. Therefore, such a projection formed of the escaped frozen mix that is visible on the front face side should be removed.

Thus, it is contemplated that the interior of the mold body has a predetermined pattern in one face of the mold body, and that the non-occupied portions includes: a first non-occupied portion which is relatively large and provided on the side of the one face, and a second non-occupied portion which is relatively small and provided at a portion opposed to the one face across the occupied portion. Among the frozen mix, a part that is frozen, as the projection, at and near the second non-occupied portion on the front face side would positively compromise the aesthetic value of the ice-candy. On the other hand, the first non-occupied portion, which is substantially greater than the second non-occupied portion, is provided on the opposite side to the second non-occupied portion across the occupied portion. Therefore, most of the mix to be expanded upon the cooling step can be flowed out via the first non-occupied portion that is on the rear side opposite to the front face. Accordingly, it is possible to lessen the frozen portion of the mix to be formed at and near the second non-occupied portion. In other words, the protrusion to be formed due to the frozen mix on the front face side can be significantly lessened. Consequently, the protrusion formed at and near the second non-occupied portion can be removed by a simple method, such as by air blowing or the like, thereby securely keeping the front face side of each ice-candy formed into a complicated shape aesthetically acceptable.

The present invention may be a method of producing ice-candies, including ice-creams, sherbets and the like. Specifically, this invention also provides an ice-candy producing method, comprising the steps of: filling a raw material liquid for an ice-candy in a predetermined forming container; freezing the raw material liquid in the forming container for forming an ice candy by cooling the forming container; and releasing the ice-candy from the forming container, the ice-candy being to be obtained by freezing the raw material liquid in the freezing step, wherein a heating step using a heating plate for heating the ice-candy by pressing the forming container against the heating plate is provided between the freezing step and the releasing step.

Namely, in order to release the ice-candy from the forming container, it is necessary to slightly melt a portion of the frozen mix of the ice-candy adhered to the forming container due to the freezing step. To this end, uniform and stable heating can be provided to each ice-candy, by utilizing the heating plate upon the heating step for the ice-candy. Accordingly, uniform and proper melting for the frozen adhered portion of each ice-candy can be achieved without causing undue heating, thereby releasing the ice-candy from the forming container while minimizing a loss of shape of the ice-candy.

It is also contemplated that the forming container according to this invention includes a first mold and a second mold. Namely, the forming container of this aspect includes the first mold having one face in which a pattern portion is formed, the pattern portion being able to be filled with a raw material liquid for an ice-candy, and the second mold configured to slide over and along the one face of the first mold in a close contact relation such that the second mold can exchangeably take a containing-in position in which it contains the first mold therein and a non-containing-in position in which it is removed from the first mold, wherein in the containing-in position, the second mold contacts closely with substantially the whole surface of the outer periphery of the pattern portion of the one face of the first mold, and wherein the heating step using the heating plate includes a step of pressing a back face opposed to the one face and a portion corresponding to a face adjacent to both of the one face and the back face of the first mold against the heating plate, in the non-containing-in position of the second mold.

Thus, selective heating only for the frozen portion adhered between the ice-candy and the first mold can be achieved, as such unwanted melting, other than required for releasing the ice-candy from the first mold, can be avoided.

In the case of releasing each ice-candy from the mold after heating it by utilizing the heating plate or the like, the ice-candy is separated from the mold with its surface being melted. Therefore, it is contemplated that the released ice-candy is dried by blowing a cold wind over it before it is packaged in a decorative film or the like. Accordingly, the present invention also includes an ice-candy producing method, comprising the steps of: filling a raw material liquid for an ice-candy in a predetermined forming container; freezing the raw material liquid in the forming container for forming an ice candy by cooling the forming container; and releasing the ice candy from the forming container, the ice candy being to be obtained by freezing the raw material liquid in the freezing step, wherein a heating step for heating the ice-candy is provided between the freezing step and the releasing step, and wherein after the releasing step, a drying step, for drying the ice-candy by blowing a cold wind over the ice-candy having been released from the forming container, is performed. In this way, adhesion of the ice-candy to the decorative film and/or a backing paper to be enclosed therein can be prevented.

The ice-candy producing method according to the present invention also features a step of releasing each ice-candy including a stick from the mold. Namely, for producing the ice-candy including the stick, a mold provided with a stick holding portion provided at an edge of the pattern portion located in a predetermined direction is employed as the mold for forming the ice-candy. In this case, the stick is held by the stick holding portion such that one end of the stick is inserted in the pattern portion so as to be embedded in the ice-candy to be formed therein while the other end of the stick is projected to the outside so as to serve as a handle.

Thus, the ice-candy producing method according to this invention is an ice-candy producing method employing a mold including a pattern portion formed in one face of the mold and able to be filled with a raw material liquid for an ice-candy and a stick holding portion which is configured to hold a stick of the ice-candy and provided at an edge of the pattern portion located in a predetermined direction along the one face, the method comprising the steps of: holding the stick by using the stick holding portion such that one end of the stick is inserted in the pattern portion while the other end of the stick is projected to the outside from the mold in the predetermined direction; filling the raw material liquid for an ice-candy in the pattern portion; freezing the raw material liquid by cooling the mold, with the one end of the stick being immersed in the raw material liquid filled in the pattern portion; and releasing the ice-candy from the mold, the ice-candy being to be obtained by freezing the raw material liquid in the freezing step, wherein the releasing step includes: a first releasing step of releasing one end and a portion around the one end of the ice-candy located in a direction reverse to the predetermined direction, by applying force to the other end of the stick in one direction orthogonal to the one face by utilizing the stick holding portion as a fulcrum, and a second releasing step of releasing the other portion of the ice-candy, than the portions released in the first releasing step, from the mold, by translating the ice-candy in an intermediate direction defined between the other direction orthogonal to the one face and the direction reverse to the predetermined direction.

Consequently, the ice-candy can be completely released from the mold without a loss of shape of the ice-candy. In the second releasing step, if an angle defined by the intermediate direction and the one face is approximately 45 degrees, significantly successful release of the ice-candy from the mold can be achieved.

Additionally, the ice-candy producing method of the present invention also features the temperature and time for cooling the mix and the temperature and time for heating in each step for producing the ice-candy.

Namely, the present invention is an ice-candy producing method employing a forming container, which includes a first mold having one face in which a pattern portion is formed, the pattern portion being able to be filled with a raw material liquid for an ice-candy, and a second mold configured to slide over and along the one face of the first mold in a close contact relation such that the second mold can exchangeably take a containing-in position in which it contains the first mold therein and a non-containing-in position in which it is removed from the first mold, wherein in the containing-in position, the second mold contacts closely with substantially the whole surface of the outer periphery of the pattern portion of the one face of the first mold, wherein an injection passage is provided in the first mold, the injection passage connecting one end of the first mold with the pattern portion, and wherein the raw material liquid can be injected into the pattern portion via the injection passage in the containing-in position, the ice-candy producing method comprising the steps of: immersing the forming container in a brine tank filled with a liquid of about −30° C., with the second mold being in the containing-in position in which it contains the first mold therein; filling the raw material liquid in the pattern portion of the first mold, by injecting the raw material liquid for an ice-candy into the forming container via the injection passage, while the forming container is immersed in the brine tank; removing the forming container from the brine tank about 10 minutes later after the filling of the raw material liquid in the raw material liquid filling step; immersing the forming container in a hot water tank filled with a liquid of approximately 72° C. for about 10 seconds, after the forming container removing step; removing the second mold from the first mold so as to bring the second mold into the non-containing-in position in which the second mold is removed from the first mold, after the hot water heating step; and pressing a back face opposed to the one face having the pattern portion formed therein and a portion corresponding to a face adjacent to both of the one face and the back face of the first mold against a heating plate of 80 to 90° C., in the non-containing-in position of the second mold having been brought by the second mold removing step. With such control over the temperature and time for cooling the mix and the temperature and time for heating in each step, the ice-candies of higher quality can be securely produced.

With the forming container including the first mold and the second mold as disclosed in the present invention, mixing of the coolant for the cooling step into the pattern portion and flowing out of the mix to the outside of the pattern portion can be possibly prevented. Thus, undesirable changes of the shape and taste can be avoided, thereby providing the ice-candies of higher quality. In addition, the ice-candy producing method of this invention enables each ice-candy to be successfully released from the mold without causing any loss of shape of the ice-candy, thus securely producing the ice-candy of higher quality.

DETAILED DESCRIPTION OF THE INVENTION

Hereinafter, one embodiment in which the present invention is applied to production of ice-candies will be described with reference to the accompanied drawings, for better understanding of the present invention. It should be appreciated that the embodiment described below is provided by way of example only, and is not limitative of the technical scope of the invention in any way whatsoever. For example, the ice-candy described below is only used as one example of the products to be made by the apparatus according to this invention, and an ice cream or sherbet may also be produced by applying this invention.

Figure 1A:
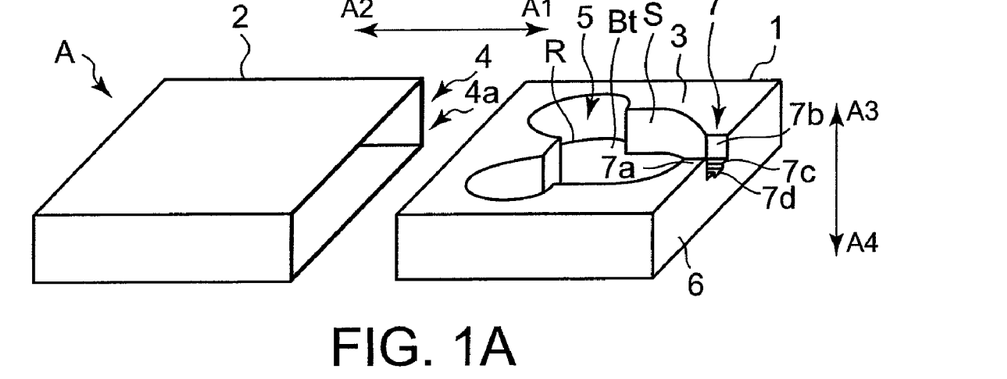
FIG. 1A and FIG. 1B are perspective views respectively showing a forming container for an ice-candy according to one embodiment of the present invention.
Figure 1B:
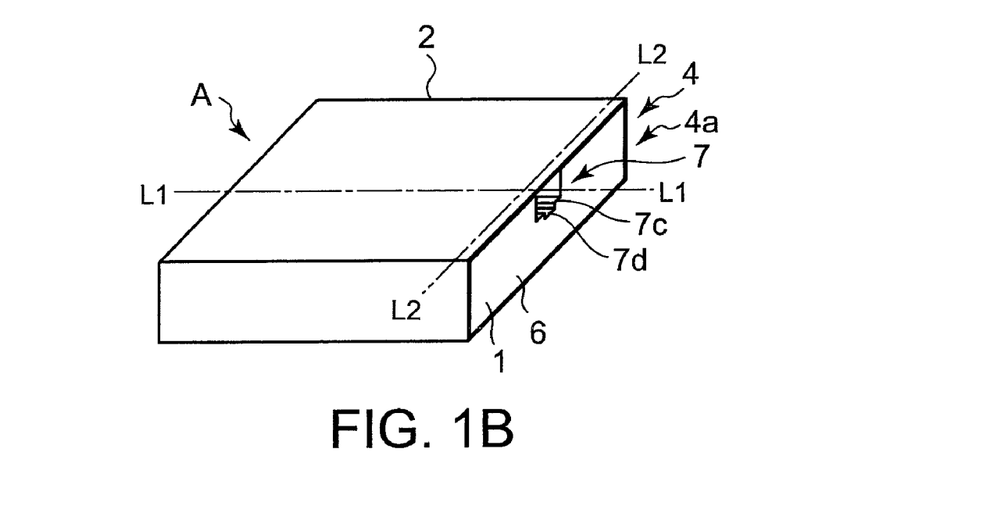
Figure 2A:
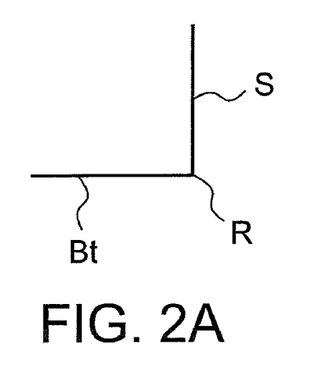
FIG. 2A and FIG. 2B are schematic views each illustrating a relationship between a bottom portion and side portions of a pattern portion formed in the forming container for an ice-candy according to the one embodiment of the present invention.
Figure 2B:
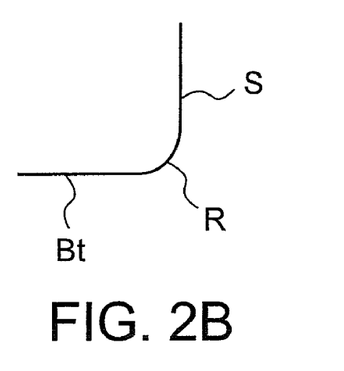
Figure 3:
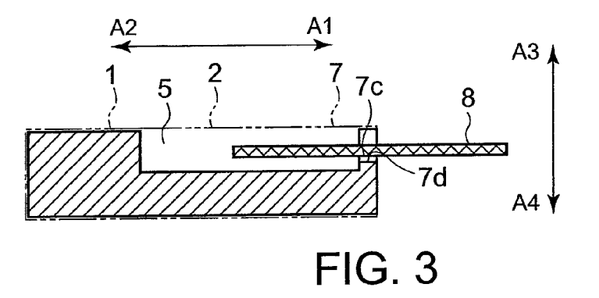
FIG. 3 is a first cross section of a first mold constituting the forming container for an ice-candy according to the one embodiment of the present invention.
Figure 4:
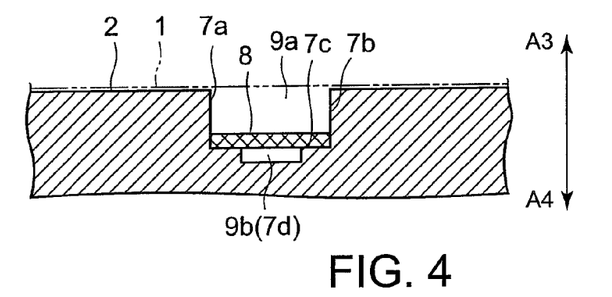
FIG. 4 is a second cross section of the first mold constituting the forming container for an ice-candy according to the one embodiment of the present invention.
Figure 5:
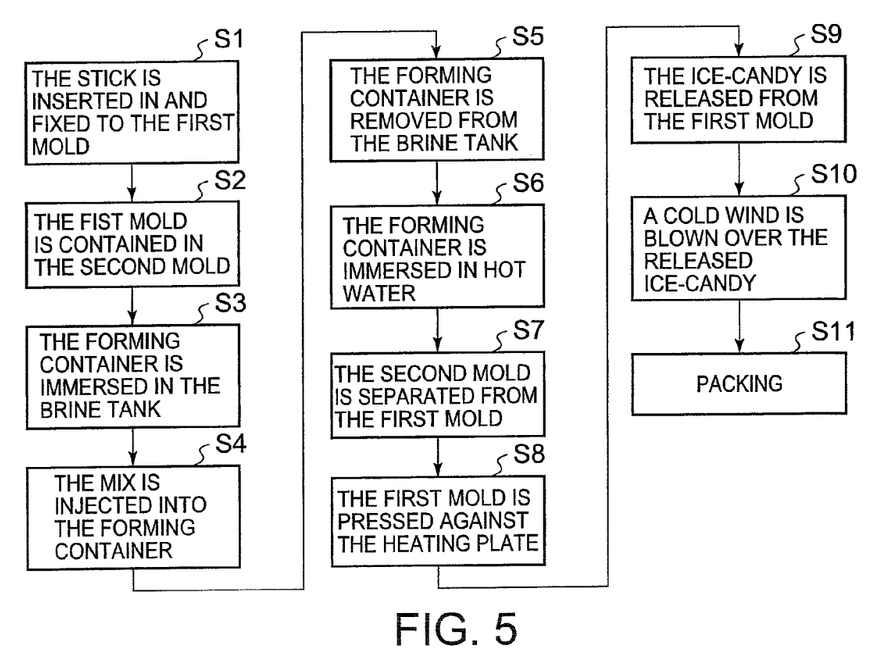
FIG. 5 is a flow chart showing an ice-candy producing method employing an ice-candy producing apparatus according to the one embodiment of the present invention.
Figure 6:
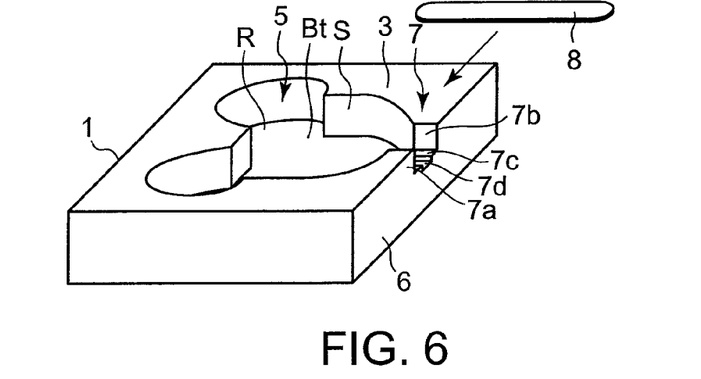
FIG. 6 is a schematic view illustrating a work of Step 1 in the ice-candy producing method according to the one embodiment of the present invention.
Figure 7:
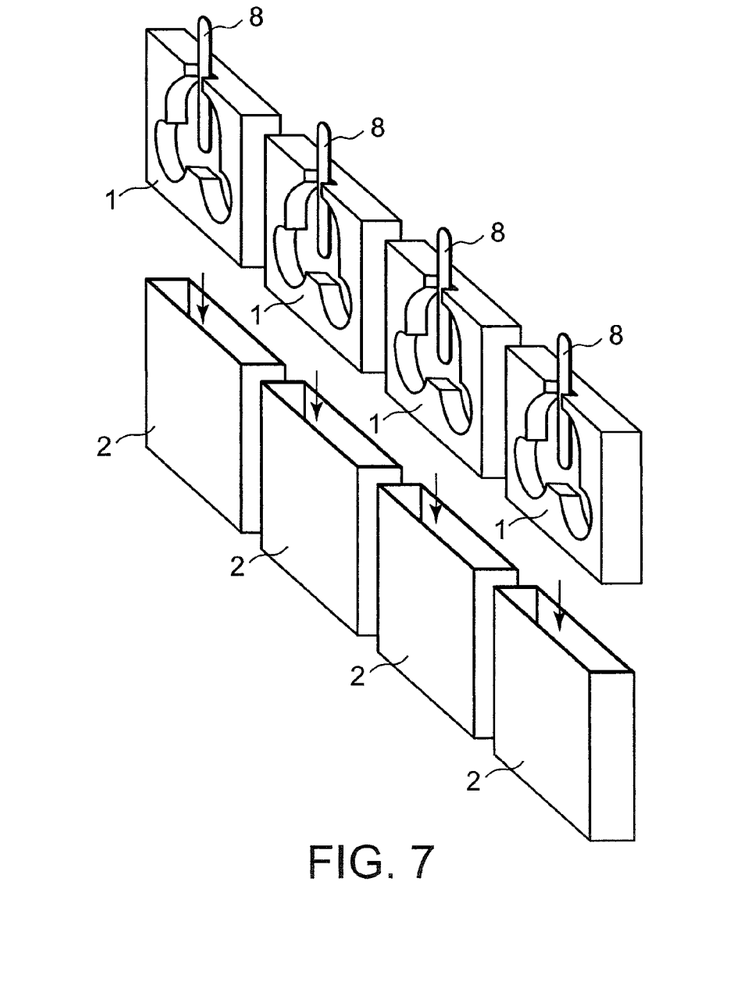
FIG. 7 is a schematic view illustrating a work of Step 2 in the ice-candy producing method according to the one embodiment of the present invention.
Figure 8:
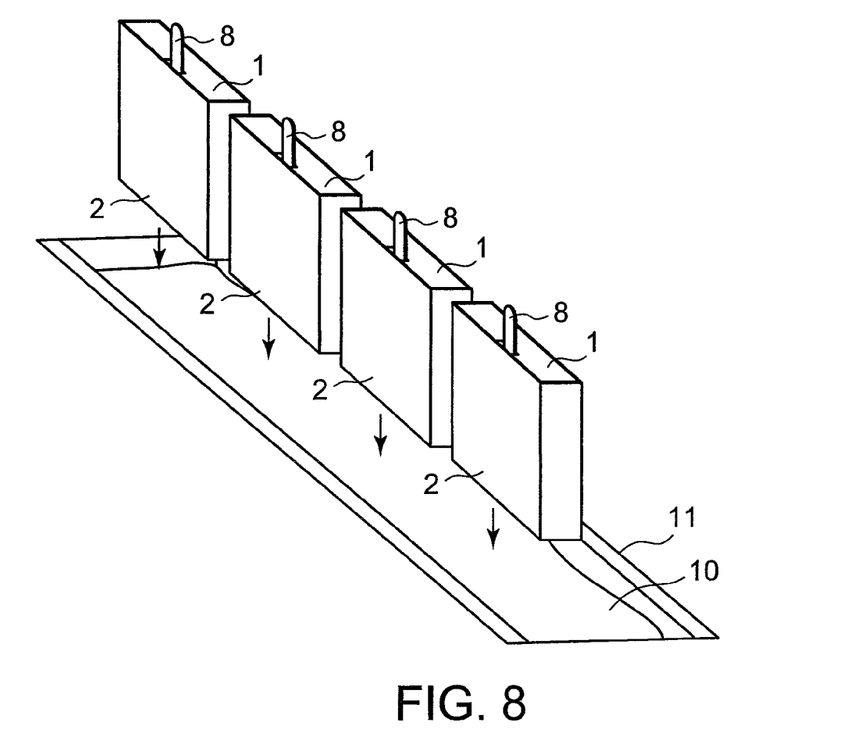
FIG. 8 is a schematic view illustrating a work of Step 3 in the ice-candy producing method according to the one embodiment of the present invention.
Figure 9:
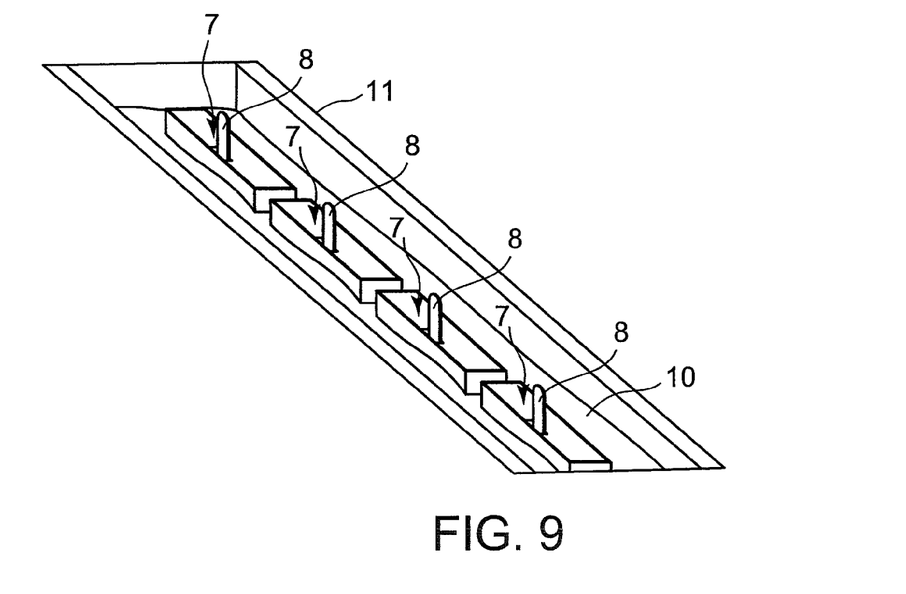
FIG. 9 is a schematic view illustrating a work of Step 4 in the ice-candy producing method according to the one embodiment of the present invention.
Figure 10:
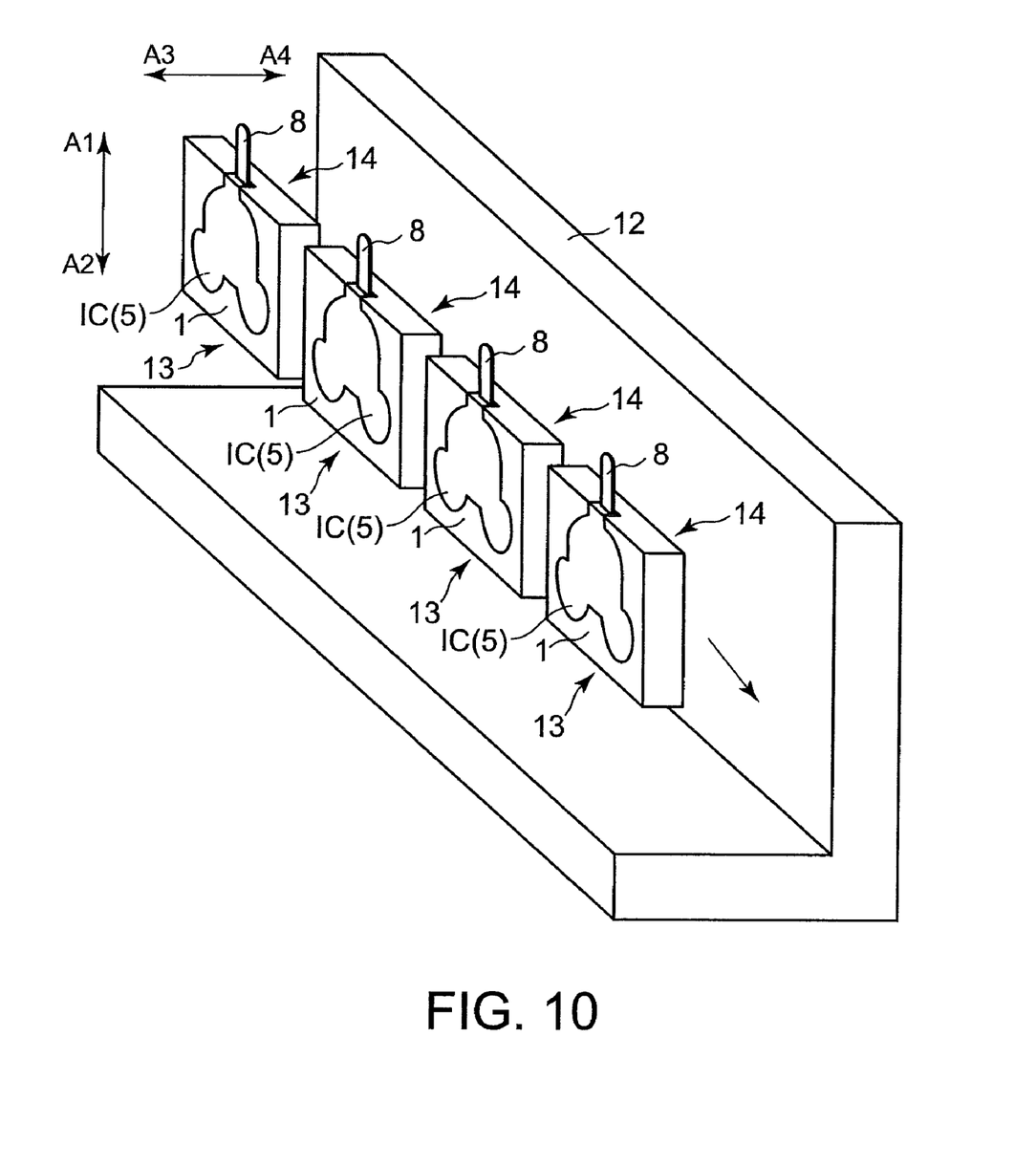
FIG. 10 is a schematic view illustrating a work of Step 8 in the ice-candy producing method according to the one embodiment of the present invention.
Figure 11A:
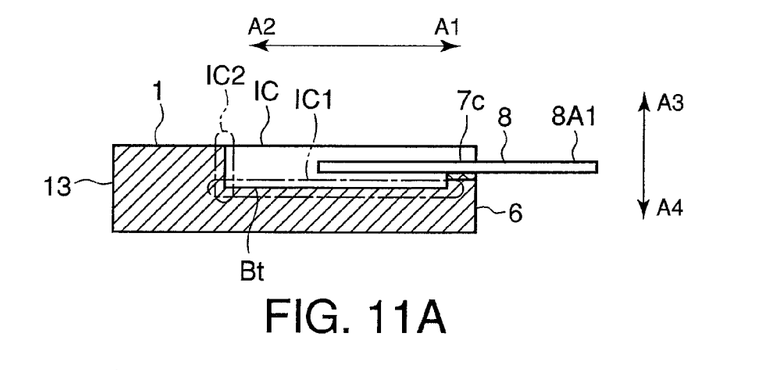
FIGS. 11A and 11B are schematic views each illustrating a work of Step 9 in the ice-candy producing method according to the one embodiment of the present invention.
Figure 11B:
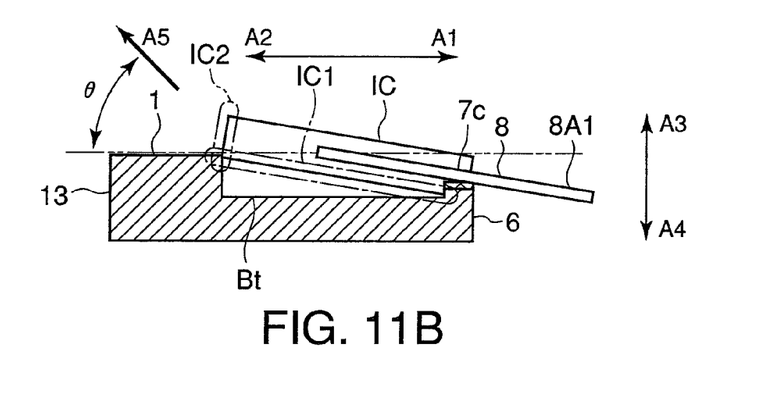
Figure 12:
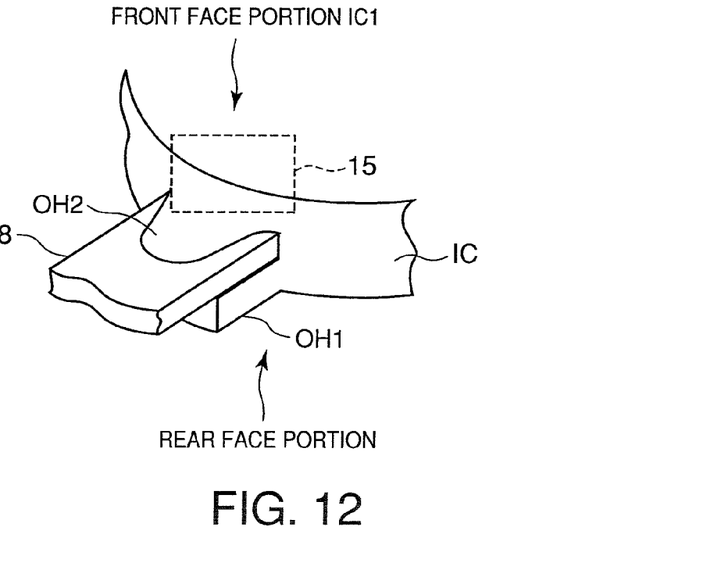
FIG. 12 is a partial perspective view of the ice-candy formed by the ice-candy forming container according to the one embodiment of the present invention.

Among the drawings, FIG. 1A and FIG. 1B are perspective views respectively showing a ice-candy forming container according to one embodiment of the present invention, and FIG. 2A and FIG. 2B are schematic views each illustrating a relationship between a bottom portion and side portions of a pattern portion formed in the ice-candy forming container according to the one embodiment of the present invention. FIG. 3 is a first cross section of a first mold constituting the ice-candy forming container according to the one embodiment of the present invention, and FIG. 4 is a second cross section of the first mold constituting the ice-candy forming container according to the one embodiment of the present invention. FIG. 5 is a flow chart showing an ice-candy producing method employing an ice-candy producing apparatus according to the one embodiment of the present invention, and FIG. 6 is a schematic view illustrating a work of step S1 in the ice-candy producing method according to the one embodiment of the present invention. FIG. 7 is a schematic view illustrating a work of step S2 in the ice-candy producing method according to the one embodiment of the present invention. FIG. 8 is a schematic view illustrating a work of step S3 in the ice-candy producing method according to the one embodiment of the present invention. FIG. 9 is a schematic view illustrating a work of step S4 in the ice-candy producing method according to the one embodiment of the present invention, and FIG. 10 is a schematic view illustrating a work of step S8 in the ice-candy producing method according to the one embodiment of the present invention. FIGS. 11A and 11B are schematic views each illustrating a work of step S9 in the ice-candy producing method according to the one embodiment of the present invention, and FIG. 12 is a partial perspective view of the ice-candy formed by the ice-candy forming container according to the one embodiment of the present invention. Finally, FIG. 13 is a perspective view of the prior art ice-candy forming container.

Now referring to FIG. 1A and FIG. 1B, the ice-candy forming container A according to the one embodiment of the present invention will be discussed.

As shown in FIG. 1A and FIG. 1B, the ice-candy forming container A (hereinafter, referred to as "the forming container A") according to the one embodiment of the present invention includes a first mold (mold body) 1 formed from aluminum and a second mold 2 also formed from aluminum.

The first mold 1 is a member of a substantially rectangular parallelepiped shape, with one face 3 having a pattern portion 5 comprising a hole with a shape copying a face of a cartoon character or the like. The pattern portion 5 can be filled with a raw material liquid (or mix) for the ice-candy or the like.

In the pattern portion 5, a ridge R or edge line defined between a bottom face Bt for forming a front face of the ice-candy and each side face S for forming a side face of the ice-candy is not a sharp corner as shown in FIG. 2A, but is rounded as shown in FIG. 2B. Thus, the ice-candy formed and frozen in the first mold can be released more easily from the first mold.

Assume that arrows A1, A2, A3, A4 depicted in FIG. 1A designate predetermined directions fixed relative to the first mold, respectively. For instance, the orthogonal direction relative to the face 3 of the first mold 1 in which the pattern portion 5 is formed is the direction designated by the arrow A3. The direction designated by the arrow A4 is defined as the reverse direction to the direction designated by the arrow A3. The arrows A1 and A2 are defined herein as the respective orthogonal directions to the direction depicted by the arrow A3. Accordingly, the respective directions designated by the arrows A1 and A2 are the ones defined along the face 3.

In a particular face 4 of the second mold 2, an opening 4a is formed. The second mold 2 is a box-shaped member configured to contain the first mold therein through the opening 4a.

Specifically, the second mold 2 can slide over the first mold 1 in the directions of the arrows A1 and A2 along the face 3 of the first mold 1 in a close contact relation. With such a slidable close contact relation, the second mold 2 can exchangeably take a containing-in position in which it contains the first mold 1 therein as shown in FIG. 1B and a non-containing-in position in which it is removed from the first mold 1 as shown in FIG. 1A.

In the containing-in position, the second mold 2 contacts closely with the whole surface of the outer periphery of the pattern portion 5 of the inner first mold 1 except for a stick holding portion 7. Thus, leakage of the mix to be filled in the pattern portion 5 can be securely prevented.

FIG. 3 is a first cross section of the first mold 1 taken along line L1-L1 as shown in FIG. 1B, and FIG. 4 is a second cross section of the first mold 1 taken along line L2-L2 as shown in FIG. 1B. Now, the first mold 1 will be described in more detail with reference to FIGS. 1A, 1B and FIGS. 3 and 4.

As shown in FIGS. 1A, 1B and FIGS. 3 and 4, at one end 6 (hereinafter referred to as "a first end 6") located in the direction of the arrow A1 of the first mold 1, the stick holding portion 7 is provided for holding a stick 8 of an ice-candy IC (see, FIGS. 10, 11A, 11B, etc.). The stick holding portion 7 is a notched portion having a substantially concave cross section surrounded by a left wall 7a, a right wall 7b and a bottom wall 7c. As shown in FIG. 3, the stick holding portion 7 connects the pattern portion 5 with an external space from the first end 6 in the aforementioned containing-in position, i.e., when the second mold 2 contains the first mold 1 therein. Accordingly, the stick holding portion 7 also serves as an injection passage that enables the mix to be injected into the pattern portion 5 in the containing-in position. In other words, the mix can be injected into the pattern portion 5 via the injection passage. Additionally, in the bottom portion 7c of the stick holding portion 7, a concave groove 7d is formed along the directions of the arrows A1 and A2.

The stick holding portion 7 is a communication hole configured to communicate the interior (i.e., the pattern portion 5) with the exterior of the forming container A in the containing-in position. Through the stick holding portion 7, the stick 8 of the ice-candy can be inserted into the interior from the exterior of the forming container A.

As shown in FIG. 4, the stick 8 of the ice-candy is held in the stick holding portion 7 while being in contact with the bottom portion 7c and interposed between the left wall 7a and the right wall 7b.

The stick holding portion 7 (or communication hole) is not fully occupied by the stick 8, and thus includes non-occupied portions for communicating the interior (i.e., the pattern portion 5) with the exterior of the forming container A, without being occupied by the stick 8, even when the stick 8 is inserted through and held in the stick holding portion 7. Namely, the stick holding portion 7 (or communication hole) includes an occupied portion to be occupied by the stick 8 when the stick 8 is inserted therein as well as includes non-occupied portions 9a, 9b for communicating the interior (i.e., the pattern portion 5) with the exterior without being occupied by the stick 8 when the stick 8 is inserted in the stick holding portion 7. The relatively large first non-occupied portion 9a is provided in an area of the pattern portion 5 on the side of the face 3 (or located in the direction of the arrow A3) relative to the stick 8, while the relatively small second non-occupied portion 9b is provided in another area of the pattern portion 5 opposed to the first non-occupied portion 9a (or located in the direction of the arrow A4) across the stick 8. These non-occupied portions 9a and 9b are separated from each other by the occupied portion due to the stick 8. It should be appreciated that the second non-occupied portion 9b corresponds to the groove 7d. The reason for providing the stick holding portion 7 in such a manner will be detailed below.

FIG. 5 is the flow chart showing a procedure for producing the ice-candy (or ice-candies) according to the ice-candy producing method (hereinafter, referred to as "the ice-candy producing method according to the present invention") employing the ice-candy forming container A according to the one embodiment of the present invention. Referring now to FIG. 5, the method and the procedure for producing the ice-candy according to the present invention will be described. Reference characters S1, S2, . . . designated in FIG. 5 are for respectively expressing a number of each step in the procedure of production, and thus the production of the ice-candy starts from a step S1. It should be noted that the work for each step described below may be manually performed by a worker(s) or automatically done by a manufacturing apparatus employing appropriate actuators.

In the step S1, as shown in FIG. 6, the ice-candy stick 8 is inserted in the first mold 1. Specifically, as shown in FIG. 3, an intermediation portion of the stick 8 is interposed between the left wall 7a and the right wall 7b so as to be held in the stick holding portion 7, with one end of the stick 8 extending in the interior (or pattern portion 5) of the forming container A while the other end projecting toward the exterior (in the direction of the arrow A1) from the forming container A (or first mold 1). However, it should be appreciated that the work of the step S1 is one example of holding the stick.

In a step S2 following the step S1, the second mold 2 is moved to slide over the first mold 1 in a close contact relation such that the second mold 2 fully contains the first mold 1 therein (see FIG. 1B). For example, as shown in FIG. 7, in the case where the respective second molds 2 are arranged and fixed in large numbers while each opening 4a faces upward, the first molds 1 each holding the stick 8 are inserted individually into the second molds 2, from above, with each stick 8 projecting upward.

In a step S3 following the step S2, as shown in FIG. 8, the second molds 2 (i.e., the forming containers A), in the containing-in position that each second mold 2 contains the first mold 1 therein, are immersed and cooled in a brine tank 11 filled with a liquid 10 of approximately −30° C. as a coolant.

The coolant liquid 10 to be filled in the brine tank 11 may contain potassium chloride or the like. However, in the case of employing such a potassium chloride solution as the coolant liquid 10, there would be a risk of rendering each ice-candy to be produced an undesirably bitter taste if the liquid 10 were flowed into the forming container A. Accordingly, in order to prevent such undesirable change of the taste of each ice-candy, a food additive, such as protein glycol or the like, may be used as an additive for the coolant liquid 10. The work described in this step S3 is an exemplary step for cooling the forming containers.

In a step S4 following the step S3, as shown in FIG. 9, the mix is injected into each forming container A via each stick holding portion 7 (one example of the injection passage) while each forming container A is immersed in the brine tank 11, so that the mix can be filled in the forming container A (i.e. in the pattern portion 5 formed in the face 3 of each first mold 1). The work described in this step S4 is an exemplary step for filling the forming containers A with the raw material liquid.

While each forming container A is immersed in the brine tank 11 after the injection of the mix into the forming container A (or in the pattern portion 5), it takes about 10 minutes for the mix to be frozen with each stick 8 is inserted therein. In this manner, the ice-candies can be produced. Such a process including the steps S3 and S4 and the waiting for cooling for about 10 minutes corresponds to an example of a freezing step.

In a step S5 following the step S4, about 10 minutes later after the injection of the mix in the step S4, the respective forming containers A are removed from the brine tank 11. This work of the step S5 is an example of a step for removing the forming containers from the brine tank.

In a step S6 following the step S5, the respective forming containers A are heated for preparing for a work (i.e., a work in a subsequent step S7) for respectively pulling out the first molds 1 from the second molds 2. Namely, the mix is frozen through the above steps S4 to S5, and each first mold 1 is firmly adhered to each corresponding second mold 2 via a frozen mix. Therefore, in the step S6, the respective forming containers A removed from the brine tank 11 are heated, such as by immersing them in a hot water tank of approximately 72° C. for about 10 seconds. Consequently, the adhesion between each first mold 1 and each second mold 2 is dissolved. This work of the step S6 is an exemplary step for heating the forming containers A in the hot water tank.

In the step S7 following the step S6, each second mold 2 is brought into the non-containing-in position that the first mold 1 is not contained in the second mold 2. Namely, each first mold 1 contained in each corresponding second mold 2 is pulled out from the second mold 2. This work of the step S7 is an exemplary step for separating the second molds 2 from the respective forming containers A.

In a step S8 following the step S7, as shown in FIG. 10, the ice-candy IC is heated, for each first mold 1, for preparing a work (i.e., a work in a subsequent step S9) for releasing each ice-candy IC or frozen mix from each first mold 1. In this manner, an adhered portion between the ice candy IC and the first mold 1 is slightly melted so as to facilitate the release of the ice-candy IC from the first mold 1.

More specifically, as shown in FIG. 10, a back face 14 of each first mold 1 (i.e., a face located in the direction of the arrow A4 of the first mold 1) opposite to the one face in which the pattern portion 5 is formed and an end face 13 (i.e., an end face located in the direction of the arrow 2 of the first mold 1) opposite to the first end 6 located in the direction of the arrow A1 are both pressed against a heating plate 12 having an L-shaped cross section. Consequently, a boundary portion of each ice-candy IC contacting with the corresponding pattern portion 5 can be slightly melted, as such the ice-candy IC can be removed from the pattern portion 5 without breaking the shape of the ice-candy IC.

It has been found that proper melting for each ice-candy IC can be performed when the temperature of the heating plate 12 is set within a range of approximately 80° C. to 90° C. If the heating plate is set within such a temperature range, the time required for pressing each first mold 1 against the heating plate 12 is several seconds. However, it should be noted that such heating temperature and heating time to achieve such proper melting are based on the condition that each first mold 1 is made from aluminum. Namely, the proper heating temperature and heating time will vary with the quality of the material from which each first mold 1 is made. Such a work of the step S8 is an exemplary step for heating each first mold 1 by using the heating plate.

In the step S9 following the step S8, each ice-candy IC obtained by freezing the mix is released from each first mold 1. This step S9 is an example of a releasing step.

FIGS. 11A and 11B are cross sections of the first mold 1, respectively illustrating a method of releasing each ice-candy in the step S9. Hereinafter, the method of releasing the ice-candy IC in the step S9 will be described with reference to FIGS. 11A and 11b.

In the step S9, each frozen ice-candy IC is initially adhered to the first mold 1. In particular, among portions of the ice-candy IC, a front face portion IC1 closely adhered to the bottom portion Bt of the first mold 1 and other portions closely adhered to side face portions S of the first mold 1, such as an end portion IC2 (hereinafter referred to as "a second end portion IC2") located in the direction of the arrow A2 are mainly adhered to the first mold 1.

In FIG. 11A, a proper amount of force is applied to one end 8A1 located in the direction of the arrow A1 of the stick 8, in one direction (i.e., the direction of the arrow 4 depicted in FIGS. 11A and 11B) orthogonal to the face 3 in which the pattern portion 5 is formed. At the time, the bottom portion 7c of the stick holding portion 7 holding the stick 8 serves as a fulcrum for the stick 8, as such a turning force for lifting or rotating the ice-candy IC in the direction of the arrow A3 in FIGS. 11A and 11B, about the bottom portion 7c, is applied to the ice-candy IC. Thus, the second end portion IC2 and a portion around the second end portion IC2 of (or the periphery or the like) of the front face portion IC1 are first released from the first mold 1. This is one example of a first releasing step.

Subsequently, as shown in FIG. 11B, the ice-candy IC inclined due to the first releasing step is translated in a direction depicted by an arrow A5 that is intermediate between the direction of the arrow A2 (i.e., the direction along the face 3) and the direction orthogonal to the face 3 (i.e., the direction of the arrow A3). As a result, the remaining portion left unreleased in the aforementioned first releasing process, i.e., the portion of the front face portion IC1 not adjacent to the second end portion IC2, can be released, as such the ice-candy IC can be fully released from the first mold 1. This is one example of a second releasing step. In this case, if the angle θ defined between the direction (or intermediate direction) of the arrow A5 and the face 3 is about 45°, the ice-candy IC can be released successfully while possibly suppressing a loss of shape of the ice-candy IC.

In a step S10 following the step S9, a cold wind is blown over each ice-candy released from the first mold 1. There are two reasons for this process.

A first reason is as follows.

Due to the works of the step S6 and step S8, the surface of each ice-candy IC is melted. Thus, the cold wind is blown over the ice-candy IC in the step S10 in order to dry up its melted surface. This work of the step S10 is one example of a drying step. This can prevent, for example, adhesion of the ice-candy IC to a backing paper that is enclosed together with the ice-cream IC in a decorative film. By cooling again the surface of the ice-candy IC to bring it into a lower temperature state, aesthetic value of the ice-candy IC can be enhanced because of attachment of white frost over the surface of the ice-candy IC when a purchaser removes the packing of the decorative film from the ice-candy IC.

A second reason is as follows.

As described above, in the stick holding portion 7 (or communication hole) included in the first mold 1, the first non-occupied portion 9a and the second non-occupied portion 9b are provided to make excessive expanded mix escape to the outside of the pattern portion 5. Namely, from the step S4 through the step S5, the expanded mix due to the cooling is flowed out via the first non-occupied portion 9a and the second non-occupied portion 9b. When the mix is frozen in such a state, as shown in FIG. 12, a first projecting frozen part OH1 and a second projecting frozen part OH2 of the mix having been flowed out via the first and second non-occupied portions 9a, 9b will be formed integrally with the ice-candy IC. Namely, the projecting frozen parts OH1 and OH2 are located both on the rear face side (i.e., on the side of the face located in the direction of the arrow A3) and on the side of the front face portion IC1 (i.e., on the face to be formed by the bottom portion Bt of the pattern portion 5) across the stick 8, respectively.

As previously described, the pattern portion 5 for forming the front face portion IC1 of the ice-candy IC includes the hole with a shape copying a face of, for example, a cartoon character or the like. Thus, there is a need for keeping an aesthetic value of the front face portion IC1 in more preferred state. To this end, in the step S10, it is intended to remove the second projecting frozen part OH2 formed on the side of the front face portion IC1 of each ice-candy IC by blowing the cold wind over the ice-candy IC.

Accordingly, by making the second non-occupied portion 9b on the side of the front face portion IC1 of the ice-candy IC corresponding to the pattern portion 5 smaller than the first non-occupied portion 9a on the rear face side (located in the direction of the arrow A3), the second projecting frozen part OH2 can be removed with ease, from the side of the front face portion IC1 requiring to keep a desired aesthetic value, such as by blowing the cold wind or the like.

While the case not including the second non-occupied portion 9b (or the case in which the groove 7d is not provided) is seems to be advantageous because the second projecting frozen part OH2 can not be created, such a case would be associated with the following problems. Namely, if the second non-occupied portion 9b is not provided, the air initially present or to be contained in the pattern portion 5 can not fully escape from the pattern portion 5 in the step S4. Thus, air bubbles would be created in each ice-candy IC to be produced by freezing the mix. In particular, the air bubbles may tend to gather around the insertion point 15, as shown in FIG. 12, of the stick 8 into the ice-candy IC. Accordingly, the aesthetic value on the side of the front face portion IC1 of the ice-candy IC would be significantly degraded.

In a step S11 following the step S10, the packing for each ice-candy IC, i.e., the packing for the ice-candy IC with a predetermined decorative film is performed. In this case, the backing paper for the ice-candy IC may be enclosed in the decorative film together with the ice-candy IC.

As described above, according to the forming container A including the first mold 1 and the second mold 2 of the present invention, mixing of the coolant liquid 10 into the pattern portion 5 and flowing out of the mix to the outside from the pattern portion 5 or the like can be possibly prevented. Accordingly, undesirable changes of shape and taste of the ice-candies can be securely prevented, thereby providing the ice-candies IC of higher quality. According to the ice-candy producing method of this invention, each ice-candy can be released from the mold without losing its shape, thus ensuring to produce the ice-candies IC of higher quality.

The invention claimed is:

1. An ice-candy forming container, comprising:
   a mold body having an interior in which a raw material liquid for an ice-candy can be filled, and having a communication hole, which is in communication with the interior and configured to allow a stick of the ice-candy to be inserted from an exterior of the mold body into the interior;
   wherein the communication hole includes an occupied portion that is occupied by the stick when the stick is inserted, and non-occupied portions, formed adjacent to the occupied portion, which are not occupied by the stick when the stick is inserted, and which are configured to communicate between the interior of the mold body and the exterior of the mold body;
   wherein the mold body further comprises
      a first mold having one face in the interior having a pattern portion formed therein that is able to be filled with the raw material liquid for the ice-candy,
      a second mold configured to slide over and along the one face of the first mold in a close contact relation such that the second mold can exchangeably take a containing-in position in which it contains the first mold therein and a non-containing-in position in which it is removed from the first mold, wherein in the containing-in position, the second mold closely contacts substantially a whole surface of an outer periphery of the pattern portion of the one face of the first mold, and
      an injection passage provided in the first mold, the injection passage connecting one end of the first mold with the pattern portion, wherein the raw material liquid for the ice-candy is injected into the pattern portion via the injection passage in the containing-in position; and
   wherein the non-occupied portions of the communication hole include
      a first non-occupied portion, having a rectangular cross-sectional shape that is substantially the same size as a width of the stick, provided on a portion of the one face of the first mold, and
      a second non-occupied portion, having a rectangular cross-sectional shape that is smaller than the width of the stick, provided on another portion of the one face of the first mold opposing the first non-occupied portion across the occupied portion.

2. The ice-candy forming container according to claim 1, wherein at least one of the first mold and the second mold is formed from aluminum.

* * * * *